July 1, 1969

J. R. D'ENTREMONT 3,453,577

COMPACT THERMOSTATIC SNAP SWITCH WITH HEATER FOR
PROTECTION OF MOTOR WINDINGS AND THE LIKE

Filed Dec. 15, 1966

John R. D'Entremont,
Inventor.
Koenig, Senniger, Powers and Leavitt,
Attorneys.

United States Patent Office 3,453,577
Patented July 1, 1969

3,453,577
COMPACT THERMOSTATIC SNAP SWITCH WITH HEATER FOR PROTECTION OF MOTOR WINDINGS AND THE LIKE
John Raymond D'Entremont, Attleboro, Mass., assignor to Texas Instruments Incorporated, Dallas, Tex., a corporation of Delaware
Filed Dec. 15, 1966, Ser. No. 601,932
Int. Cl. H01h 61/04, 71/16
U.S. Cl. 337—89  3 Claims

ABSTRACT OF THE DISCLOSURE

A heater element and a snap-acting thermostatic plate are organized as one subassembly for convenient insertion with insulation into a small conductive container and welding therein. Organized as a second subassembly is a header carrying an exterior terminal and an interior contact. This second assembly is hermetically sealed to the container after insertion of the first assembly. The two subassemblies are thereby placed in an improved operating relationship wherein contacts within the container are related so as to minimize damaging arcing conditions in the smaller space within the container as dictated by its small size. The heater is formed as a stop for snap action of the plate in a manner such as to increase the operating life of the plate. When acting as a plate stop the heater element also injects heat into the plate for restricting off-times and earlier peak winding temperatures under locked-rotor starting conditions when the switch is used in a motor protection circuit.

BACKGROUND OF THE INVENTION

The invention is an improved, compact and low-cost thermostatic switch of the type such as shown in U.S. Patent 3,194,924. In motor circuits low-cost, thermally responsive protective switches are desired to be placed in small spaces among the windings. These must be made as small as possible without sacrificing reliability of operation. By means of the invention economical manufacturing operations are preformed on unique subassemblies before insertion into a very small casing for final compact assembly. The parts of the final assembly are so arranged that despite their compact relationship in the small casing reliable operation over a long life can be expected.

SUMMARY

A thermostatic switch comprising a conductive casing in which is a preassembly of a serially connected heater and cantilever-mounted snap-acting contact-carrying plate. The heater is welded to the casing so that the casing becomes one terminal of the switch. The casing is enclosed by a preassembly of a header and a single-pin terminal carrying another contact. The heater and plate are so shaped and arranged upon complete assembly that the heater acts as a non-damaging stop for contact-opening snap action of the plate and also to inject heat into it when acting as a stop. The contacts are arranged so that the plate is protected against damage from any arc strikes between contacts. The casing is bendable for calibration.

BRIEF DESCRIPTION OF THE DRAWINGS

Corresponding reference characters indicate corresponding parts throughout several views of the drawings. The phrase metallurgically bonded as used herein comprehends any electrically conductive bond such as welding, brazing, soldering or the like.

DESCRIPTION OF THE PREFERRED EMBODIMENT

Figure 1:
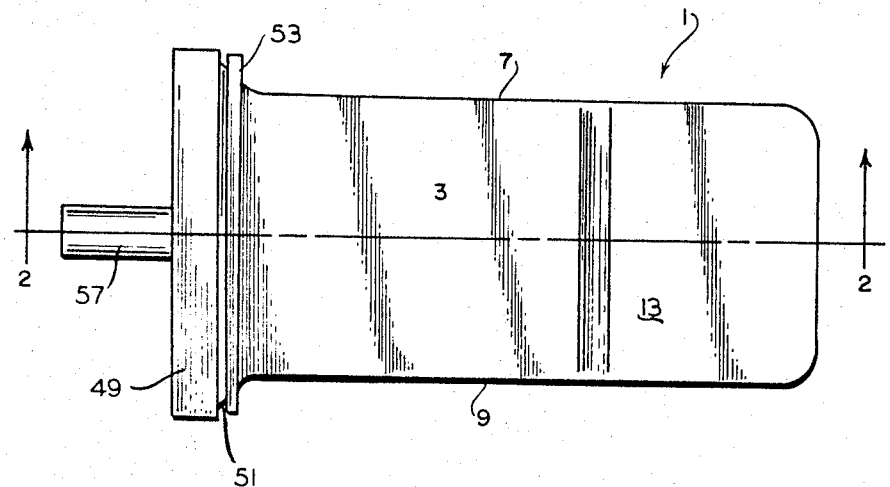
FIG. 1 is a plan view of the complete switch, drawn to an enlarged scale.
Figure 2:
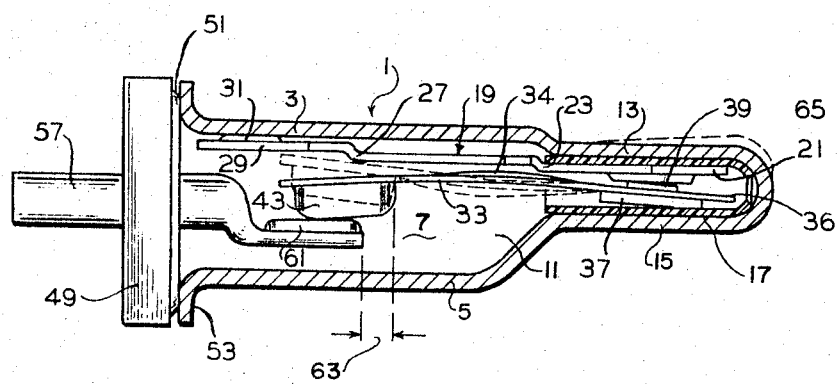
FIG. 2 is a cross section taken on line 2—2 in FIG. 1, some parts being shown in elevation, the dotted lines showing an alternate position of a snap-acting plate.

Referring now more particularly to FIGS. 1 and 2 of the drawings, there is shown at numeral 1 a small substantially flat steel casing. This is formed by top, bottom and side wall 3, 5, 7 and 9 respectively. These provide a small inside pocket or compartment 11. The top and bottom walls 3 and 5 are pinched together at 13 and 15 to form an even smaller substantially flat compartment or pocket 17. This pocket 17 is offset on one side of pocket 11 (FIG. 2). The pocket 17 is bendable relative to the metal-forming compartment 11, as shown by the dotted line in FIG. 2, for purposes which will appear below.

Figure 3:
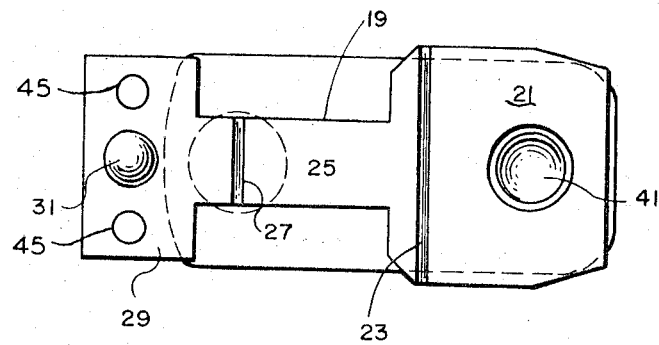
FIG. 3 is a plan view of a first heater and snap-acting plate subassembly.
Figure 4:
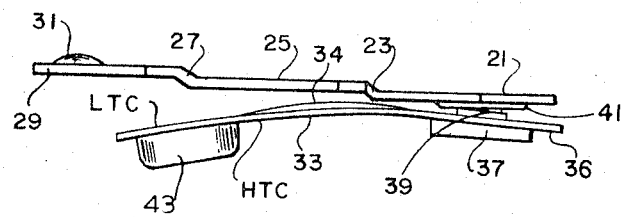
FIG. 4 is a front elevation of the subassembly shown in FIG. 3.

Referring to FIGS. 3 and 4, numeral 19 indicates an electrical heater composed of a wide heel portion 21, a step 23, a narrower resistance-heating strip 25, a striker step or offset 27 and a wide head portion 29. The head portion 29 is dimpled as shown at 31 and the heel portion is dimpled as shown at 41, each for welding purposes. Holes 45 flank the dimple 31. The material of the heater is any of the well-known metals or alloys to provide resistance heating by the heating strip 25.

At numeral 33 is shown a snap-acting bimetallic plate, a portion of which is deformed in the usual way, as shown at 34, to provide for a snap action in response to temperature change at a critical value. Being quite thin, the two layers of which plate 33 is composed do not show in the drawings. The layer having the high thermal coefficient of expansion is lowermost and labeled HTC. The other, having the low thermal coefficient of expansion, is uppermost and labeled LTC. A heel portion 36 of the plate 33 is provided with a slug in the form of a rivet 37. This is to provide for an electric weld 39 to the downwardly dimpled portion 31 of the heel 21 of the heater 19. The free end of the plate 33 is provided with a contact 43. The result is a subassembly as shown in FIGS. 3 and 4 in which the snap-acting plate 33 is carried as a cantilever on and under the heater 19.

Figure 5:
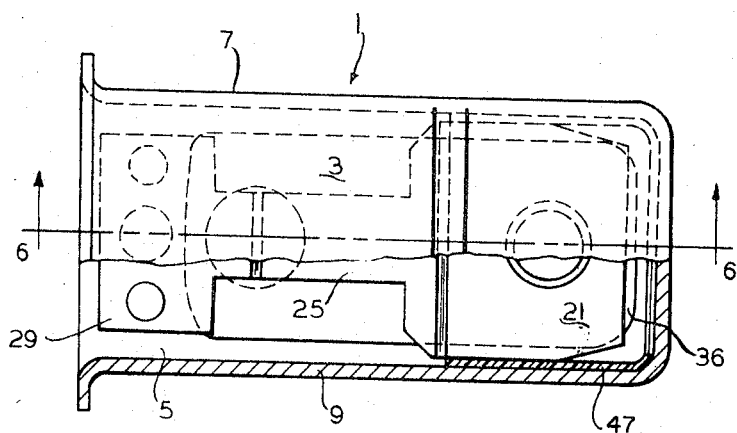
FIG. 5 is a plan view, partly in section, showing a subassembly of FIGS. 3 and 4 inserted in the switch casing.
Figure 6:
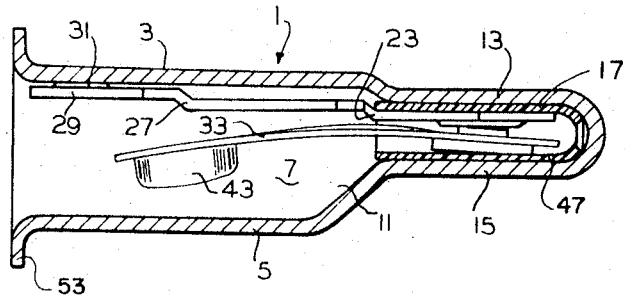
FIG. 6 is a longitudinal section taken on line 6—6 of FIG. 5.

As shown in FIGS. 5 and 6, the assembly of FIGS. 3 and 4 may be readily slipped into the casing 1 after an insulating plastic tube 47, for example composed of Teflon, has been slipped over the welded heel portions 21 and 36 of the heater 19 and plate 33. These heel portions are thus surrounded by the Teflon sleeve wedged into the small compartment 17. The sleeve acts as an insulator between the casing 1 and the electrically joined heel portions of the heater 19 and the plate 33. A spot weld is made between the dimple 31 and the top wall 3 of the compartment 11. This holds the heater-plate assembly in place in the casing 1. Thus, the casing 1 can function as one terminal of the switch as a whole.

Figure 7:
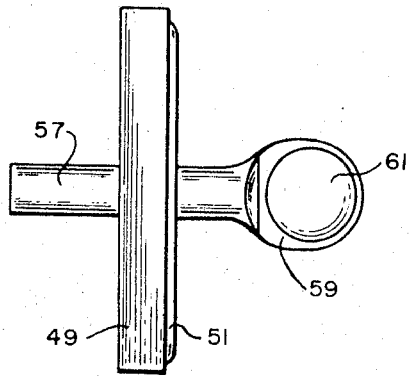
FIG. 7 is a plan view of a second subassembly comprising a header, terminal and a contact.
Figure 8:
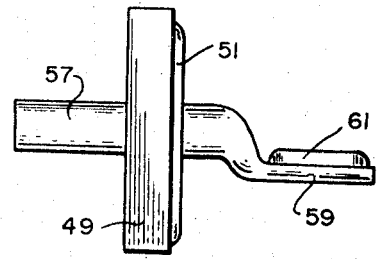
FIG. 8 is a front elevation of FIG. 7.
Figure 9:
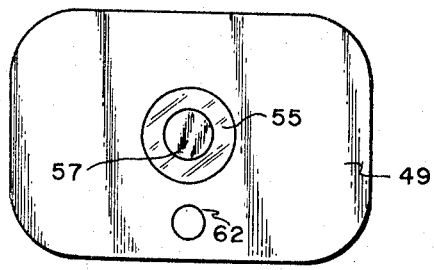
FIG. 9 is a left-end view of FIG. 8.

FIGS. 7–9 show a header subassembly. This comprises a metal plate 49 of rectangular form beveled as shown at 51 for welding to the flange portion 53 of the casing 1. Extending through a glass seal 55 in the plate 49 is a terminal pin 57. One end of the pin 57 is offset and flattened as shown at 59. The other end constitutes an external terminal of the completed switch. The offset is opposite to the offset of pocket 17 relative to pocket 11. Attached on the flattened portion 59 is an inner contact 61. The pin 57 and plate 49 should be composed of a material having a thermal coefficient of expansion near that of the glass seal as, for example, Kovar. At 62 is an orientation mark.

To complete the switch, the second subassembly of FIGS. 7-9 is inserted into the casing 1, in which has been previously located and welded the first subassembly (FIGS. 5 and 6). An hermetic seal is then made between the flange 53 and beveled portion 51 of the header, by any suitable metallurgical bonding process as, for example, by solid-phase bonding. The result is a switch as shown in FIGS. 1 and 2 wherein the contacts 43 and 61 are arranged with a contact offset 63, rather than being perfectly mated as is usual. This offset places the right side of contact 43 in the normal arc path from the right side of contact 61 to plate 33. Contact 43 therefore takes all or most of the arc strike. This prevents the arc from striking to any substantial extent into the deformed portion 34 of snap-acting plate 33 which is sensitive to damage from any extensive arcing. The arc on the other side of the contacts is discouraged from reaching the head 29 of the heater because of the long path established by the heater offset 27.

In order to calibrate the assembly switch, the compartment 17 may be bent as illustrated by the dotted lines 65 on FIG. 2. This has the effect of angling the cantilever formed by the plate 33, varying the pressure between the contacts 43 and 61 and stressing the deformation 34, whereby the switch operating temperature is varied.

The construction provides for an hermetically sealed, low-cost switch of diminutive size as, for example, about ¾ inch wide and 1½ inches long. The step 23 of the heater provides clearance for the deformation 34, and step 27 restricts the motion of the plate 33 when it is heated and snaps to open-contact position. The striking force between the plate 33 of the heater 19 is restricted to application in the area of the plate which is backed by the contact 43, rather than the area in which is the deformation 34. This results in a longer plate life. Moreover, the fact that the heater 19 itself acts as a plate stop is of advantage in applying the device as a motor overload protector because it injects heat into the plate while the plate contacts it in open position of the contacts 43 and 61. Such heat injection occurs after overload current has been shut off by the opening of the contacts 61 and 43. This restricts off-times peak winding temperatures upon attempted re-starts under locked-rotor conditions. In view of the arc control feature effected by the offset 63, smaller space in the compartment 11 is sufficient, resulting in a smaller device.

The use of the sleeve of insulation surrounding the junction between the plate and heater heels 21 and 36 not only wedges the heater and plate assembly in the casing 1 but also permits the use of the casing 1 as one side of the supply line, and the insulated pin 57 as the other side of the line, without the casing shunting the heating strip 25. The result is a single terminal pin construction which is less costly and just as useful as a two-pin construction such as formerly employed. The flat area 67 of the pin 57 which supports contact 61 also provides for flow of heat out through the pin. This effectively cools the contacts 41 and 61 when closed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostatic switch comprising a metallic casing having a closed end and an open end, the open end leading to a first pocket formed by the casing, a metallic header conductively bonded to the casing and enclosing said open end, a terminal extending into the pocket through said header and insulated therefrom, said terminal being formed with an offset extending within and toward one wall of the casing, a first contact carried by the offset, said casing forming a second and smaller pocket at its closed end which is positioned toward an opposite wall of the casing, a heater strip having a head portion conductively bonded to the casing near said open end with a heel portion located in said smaller pocket, said strip having a heating portion between the head and heel portions, a thermostatic plate having one end conductively bonded to said heel portion of the heater strip in said smaller pocket and having a free end extending toward the header, a second contact attached to said free end engageable and disengageable with said first contact, said plate having a deformation between its free end and bonded end to make it snap-acting to open and close the contacts, insulating means between the casing and the welded portions of the heater and plate, said second contact partially overlapping said first contact and the remainder of said second contact being offset in a direction away from the inner end of said first contact to absorb and protect the deformation from arc strikes between the contacts.

2. A thermostatic switch made according to claim 1, wherein said heating portion of the heater has an offset to form a striker engageable only by the free portion of the plate at which said second contact is attached.

3. A thermostatic switch made according to claim 2, wherein said heater is formed with a second offset adjacent its heel portion to position said intermediate portion clear of the casing and of said deformation.

References Cited

UNITED STATES PATENTS 2,658,175  11/1953  Clark _____ 337—100
3,213,246  10/1965  Duval _____ 337—112

BERNARD A. GILHEANY, *Primary Examiner.*

R. L. COHRS, *Assistant Examiner.*

U.S. Cl. X.R.
337—100, 110, 112